(12) United States Patent
Kalender

(10) Patent No.: US 7,023,151 B2
(45) Date of Patent: Apr. 4, 2006

(54) SWITCHING DEVICE FOR CONTROLLING AT LEAST TWO MOTORS

(75) Inventor: Tomas Kalender, Pforzheim (DE)

(73) Assignee: Stöber Antriebstechnik GmbH & Co., Pforzheim (DE)

( * ) Notice: Subject to any disclaimer, the term of this patent is extended or adjusted under 35 U.S.C. 154(b) by 0 days.

(21) Appl. No.: 10/662,941

(22) Filed: Sep. 16, 2003

(65) Prior Publication Data
US 2004/0207345 A1 Oct. 21, 2004

(30) Foreign Application Priority Data
Sep. 19, 2002 (DE) ............... 202 14 764 U

(51) Int. Cl.
H02P 1/54 (2006.01)

(52) U.S. Cl. .............. 318/34; 49/67; 49/112; 198/781.06

(58) Field of Classification Search ........ 318/34–89, 318/110–113, 280, 560–696; 307/15, 29; 341/155
See application file for complete search history.

(56) References Cited

U.S. PATENT DOCUMENTS

| | | | | |
|---|---|---|---|---|
| 4,262,336 A | * | 4/1981 | Pritchard | 700/169 |
| 4,288,727 A | * | 9/1981 | Whitford | 318/112 |
| 4,289,997 A | * | 9/1981 | Jung et al. | 318/113 |
| 4,470,092 A | * | 9/1984 | Lombardi | 361/23 |
| 4,825,133 A | * | 4/1989 | Tanuma et al. | 318/113 |
| 4,827,195 A | * | 5/1989 | Newell et al. | 318/49 |
| 4,887,941 A | * | 12/1989 | Crinquette et al. | 417/2 |
| 5,013,981 A | * | 5/1991 | Rodi | 318/67 |
| 5,126,640 A | * | 6/1992 | Leroy | 318/34 |
| 5,237,250 A | * | 8/1993 | Zeile et al. | 318/562 |
| 5,754,021 A | * | 5/1998 | Kojima | 318/466 |
| 5,923,132 A | * | 7/1999 | Boyer | 318/34 |
| 5,965,993 A | * | 10/1999 | Bak et al. | 318/280 |
| 6,144,183 A | * | 11/2000 | Kawai | 318/675 |
| 6,191,543 B1 | * | 2/2001 | Lai et al. | 318/34 |
| 6,281,645 B1 | * | 8/2001 | Matsukawa | 318/112 |
| 6,344,719 B1 | * | 2/2002 | Shibazaki et al. | 318/34 |
| 6,353,296 B1 | * | 3/2002 | Specks et al. | 318/34 |
| 6,415,914 B1 | * | 7/2002 | Itoh et al. | 198/781.06 |
| 2001/0010285 A1 | * | 8/2001 | Itoh et al. | 198/781.06 |
| 2001/0015630 A1 | * | 8/2001 | Shibazaki et al. | 318/34 |

* cited by examiner

Primary Examiner—Paul Ip
(74) Attorney, Agent, or Firm—Gudrun E. Huckett

(57) ABSTRACT

A switching device for controlling at least two motors has a single converter, wherein the at least two motors are connected to the converter by a power line and a feedback line, respectively. At least one logic module is connected to the converter and evaluates signals received from the converter to generate a control signal for controlling the motors. The converter has an interface for selecting one of the motors to be controlled, wherein the interface is connected by a signal line to the at least one logic module. The power lines and the feedback lines each have a switch. The at least one logic module is adapted to switch with the control signal at least two of the switches for switching the respective power line and the respective feedback line of the motor to be controlled.

19 Claims, 2 Drawing Sheets

SWITCHING DEVICE FOR CONTROLLING AT LEAST TWO MOTORS

BACKGROUND OF THE INVENTION

The invention relates to a switching device for controlling at least two motors.

In practice, there are many servo axes that are needed only rarely or are not needed at the same time. Such rarely needed servo axes are, for example, drives for machine (re)configuration that are used, for example, only when changing the product. In the case of other machines, kinetics or safety can prohibit that certain servo axes carry out movements at the same time.

It is known that each motor is provided with its own converter. This results in significant costs.

A conventional servo drive is comprised inter alia of a servo converter with an output stage (power amplifier) and the correlated control electronics, a motor, a position/rotary speed sensor or acceleration sensor as feedback for the motor control, a motor temperature sensor, and an optional holding brake. The sensor is usually mounted directly on the motor shaft. The optional holding brake is generally provided on the motor shaft. Servo converters for one axis and converters for several axes in one housing are known. In any case, each motor has an output stage or a servo converter assigned thereto.

SUMMARY OF THE INVENTION

It is an object of the invention to configure the switching device of the aforementioned kind such that in a constructively simple and inexpensive way several motors can be operated sequentially.

In accordance with the invention, this object is solved for the switching device of the aforementioned kind in that the motors have correlated therewith a single converter to which is connected at least one logic module that evaluates signals received from the converter and generates a control signal with which the desired motor is controllable.

In the switching device according to the invention, several motors are operated by a single servo amplifier or converter. The logic module receives from the converter signals for selecting one of the motors and connects accordingly all required lines of the selected motor to the corresponding interfaces of the converter. The precision and the resolution of the return or feedback signals are not impaired so that the switching device according to the invention can be used also in connection with highly sensitive analog systems such as a resolver or a sine/cosine transducer. The EMC immunity of the feedback lines is not impaired. It is also possible to carry out an open-circuit detection such that it will not respond during changeover to the desired motor. The feedback evaluation in the converter does not cause errors upon changeover to the desired motor.

The individual drives/motors are advantageously operated in a position control circuit. According to an advantageous embodiment, it is ensured in this connection that after each changeover operation the correct actual position value of the motor is available, respectively, so that a reference travel after each changeover is avoided. When in this connection no absolute value transducers are available for the position measurement, the actual position values are advantageously stored.

The position calculation in the converter is designed to handle different sensor, motor, and mechanical parameters, for example, transmission ratios, within the individual axes. By means of the switching device, in particular, the changeover module, the holding brake can be controlled and optionally present temperature sensors can be evaluated.

Further features of the invention result from the further claims, the description, and the drawings.

BRIEF DESCRIPTION OF THE DRAWINGS

The invention will be explained in more detail with the aid of three embodiments illustrated in the drawings. It is shown in.

DESCRIPTION OF PREFFERED EMBODIMENTS

Figure 1:
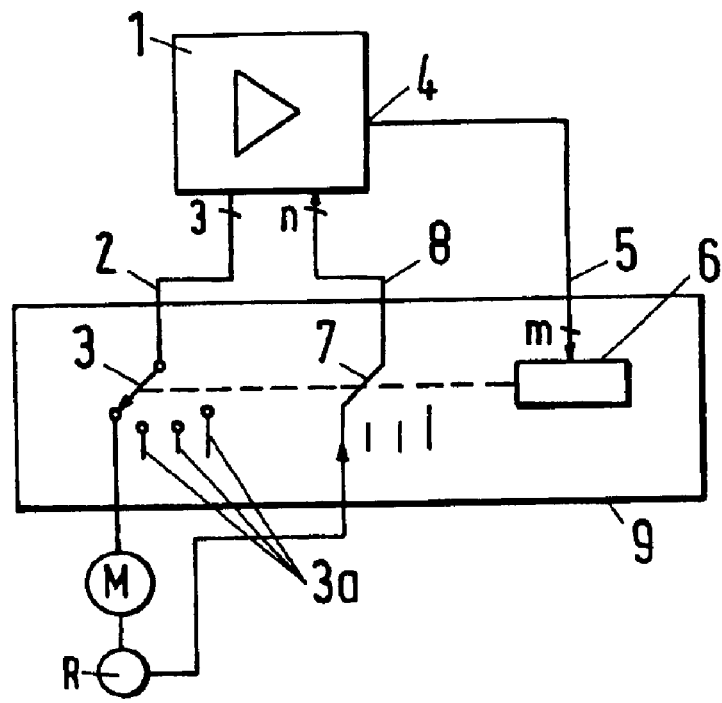
FIG. 1 a first embodiment of a switching device according to the invention.

The switching device according to FIG. 1 serves for controlling motors M and has a single servo converter 1 with which the individual motors M are controlled. The device 1 is connected by a line 2 to a power switch 3 with which the motor M can be switched, respectively. In FIG. 1, only one motor M is illustrated. The other motors are represented only by their switching contacts 3a.

The converter 1 has the interface 4. Control lines 5 are connected to the interface 4 and connect the converter 1 with the logic module 6. The logic module 6 evaluates the signals coming from the converter 1 and generates switching signals in accordance with these signals for actuating the switch 3. In accordance with the signal, the switch 3 is switched such that changeover to the desired motor M is realized.

Each motor M has a feedback sensor R that is connected by a line 8 via a switch 7 to the converter 1, respectively. In FIG. 1, the additional sensors R are represented only by the corresponding switching contacts. The two switches 3 and 7 are simultaneously switched by the logic module 6 so that the desired motor M with the correlated sensor R can be switched. Also, the control of a holding brake or the signals of a temperature sensor can be switched by means of additional switches in an appropriate way.

The employed switches 3, 7 operate as multiplexers.

Monitoring of the selected motor M is realized by line 8 via which the sensor R sends signals back to the converter 1. The feedback signals are evaluated by it.

The logic module 6 with the switches 3, 7 is a component of an options module 9. It receives in the described way from the converter 1 the signals for selecting one of several motors M and connects accordingly all required lines of the selected motor M to the corresponding interfaces 4 of the converter 1. The line changeover can be realized electro-mechanically or electronically. The switches 3, 7 are provided in the illustrated embodiment within the options module 9. However, they can also be located outside of the options module 9, i.e., can be embodied by external switches. The converter 1 is connected by m control lines 5 to the logic module 6. The motors M are connected by n lines 8 to the converter 1.

Figure 2:
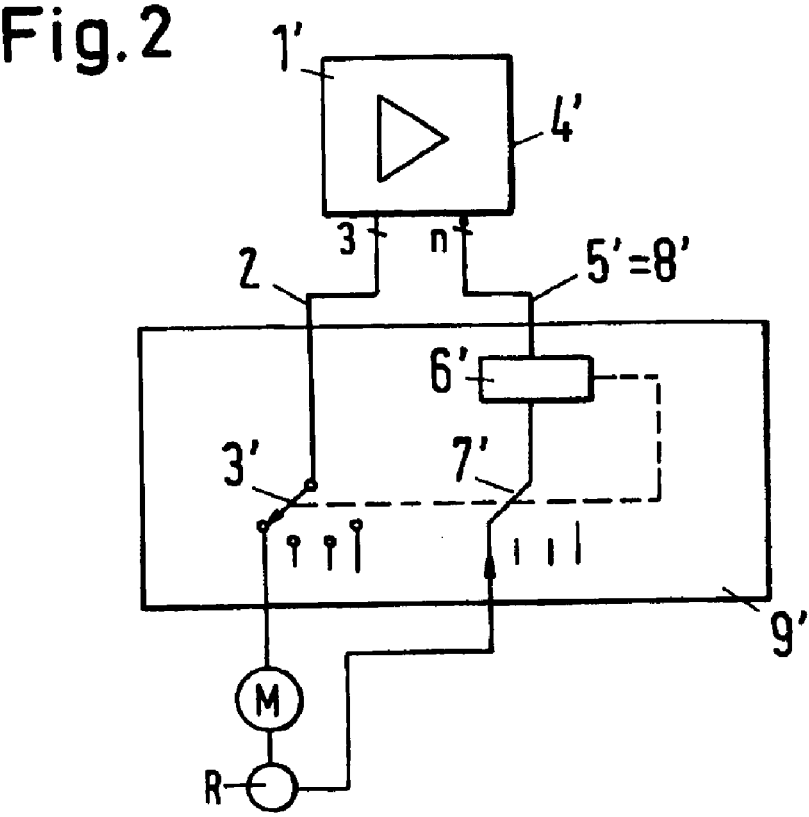
FIG. 2 a second embodiment of a switching device according to the invention.

The embodiment according to FIG. 2 employs instead of the m control lines 5 a single control line 5'. In contrast to the control lines 5, it is a bidirectional line via which the signals can be transmitted from the converter 1' to the logic module 6' and vice versa. When one of the motors M is to be actuated, by means of the servo converter 1' a corresponding signal is delivered via the bidirectional control line 5' to the logic module 6' that is part of the options module 9'. The logic module 6' evaluates the signal supplied via the bidirectional line 5' and switches the two switches 3', 7' in accordance with the preceding embodiment simultaneously. The feedback signals for monitoring the respectively controlled motor M are realized in accordance with the preceding embodiment via the logic module 6'. Via the bidirectional line 5', the signals of the logic module 6' reach the servo converter 1'.

A comparison with the embodiment of FIG. 1 shows that the bidirectional control line 5' replaces the control lines 5 and the line 8 of the embodiment according to FIG. 1.

The embodiment according to FIG. 2 operates in other regards in the same way as the preceding embodiment.

The converter 1 contains a software that comprises the control of the switching device, the timing for changeover to the individual motors M, the administration of machine data and parameter sets for each individual motor M, as well as the position detection of each individual motor M. With this software, the actual position values of the sequentially controllable motors M can be separately administered and positioning tasks with different machine data can be carried out in the individual axes.

The described embodiments result in a user-friendly sequential connection of several servo motors M to the servo converter 1, 1' that is a single axis servo converter. The options module 9, 9' or the logic module 6, 6' receive the signals from the converter 1, 1' for selecting one of several motors M and connect accordingly all required lines of the selected motor M to the corresponding interfaces 4 of the converter 1, 1'. The logic module 6, 6' filters the selection signals and switches the individual signal and power lines. The power switches 3, 3' can be an integrated component of the options module 9,1'. It is however also possible to configure the power switches 3, 3' as separate contactors, relays, and similar devices. In this case, the options module 9, 9' takes over their control.

For a correct function of the switching device, the hardware and the firmware of the converter 1, 1' are designed such that no problems will occur upon switching of the feedback lines 8, 5'. Since the software or firmware of the switching devices administers the actual position values of the sequentially controlled motors M, it is ensured that after each motor switching always the correct actual position of the axis is available, respectively.

Figure 3:
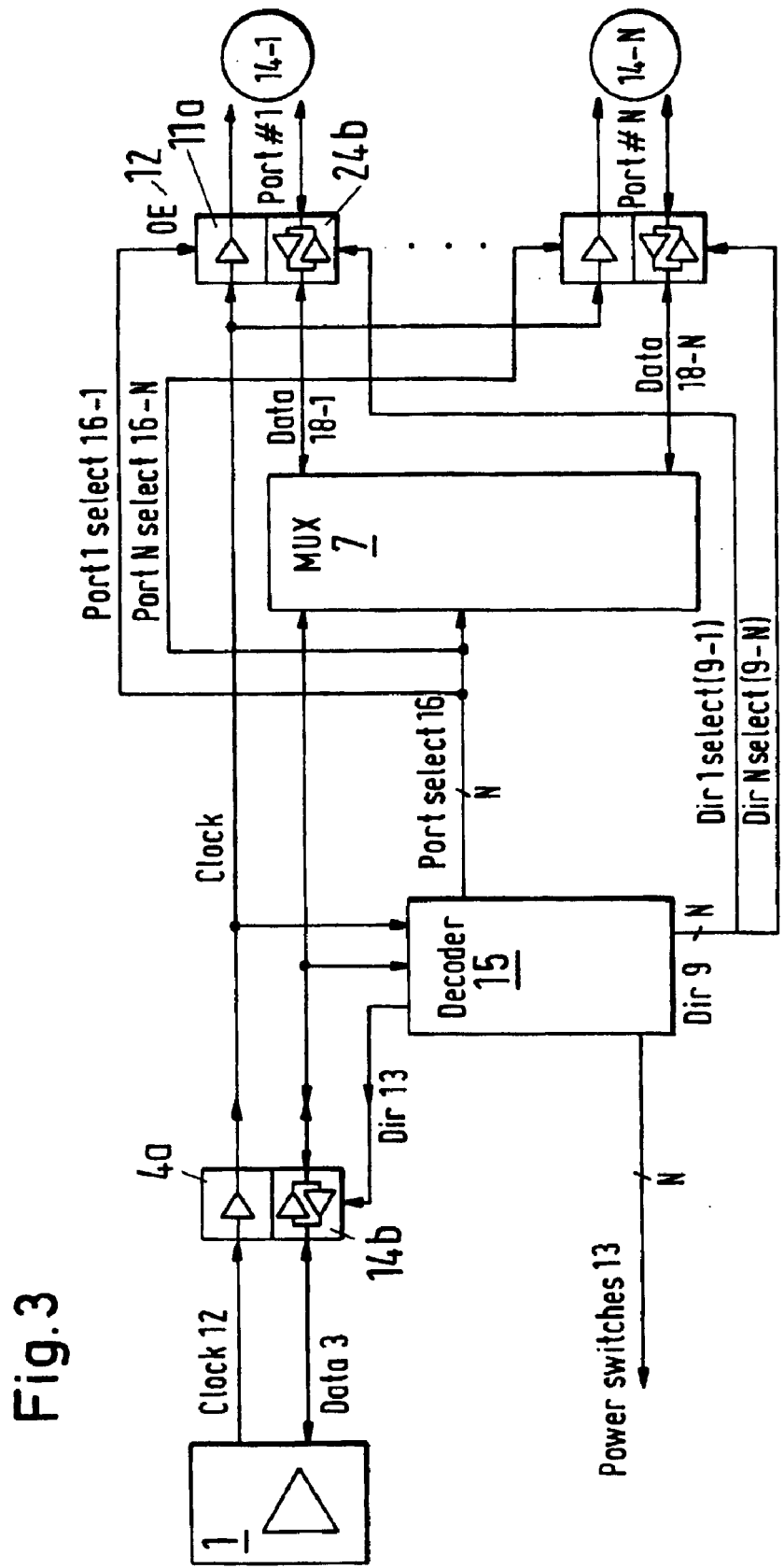
FIG. 3 a third embodiments of a switching device according to the invention.

In the embodiment according to FIG. 3, the converter 1 is connected to a multiplexer 7 that connects alternatingly several motors (encoder) 14-1 to 14-N by a bidirectional interface to the converter. The multiplexer 7 generates at the same time additional signals 13 independent of the switching position of the multiplexer 7. The control of the multiplexer 7 is realized by encoder lines CLOCK 2 and DATA 3.

A decoder 15 is arranged upstream of the multiplexer 7. It analyzes the data stream and controls, even without the presence of the aforementioned special commands, the direction of bidirectional drivers 14b, 24b to the first encoder 14-1 on the port hub 1. For selecting a different encoder port *N, the converter 1 sends via the bidirectional interface special binary encoded commands. They are designed such that they have no relevant effect on the encoder behavior and are ignored by it.

The decoder 15 generates based on the commands N signals 16 for controlling the multiplexer 7 as well as signals 9-1 to 9-N for directional switching of the bidirectional drivers 11b. The multiplexer 7 switches according to the decoded command one of the N bidirectional data lines 18-1 to 18-5 of the correlated encoders 14-1 to 14-N to a data line 23 of the converter 1.

When employing interfaces with a CLOCK signal, the corresponding drivers 11a can be deactivated for all inactive interfaces by means of the signal "output enable" OE 12.

The commands for controlling the multiplexer 7 can moreover contain additional information that can serve, for example, for generating additional signals 13. By means of the multiplexer 7, several encoders 14-1 to 14-N can be switched on alternatingly with the bidirectional interface via converter 1. The control of the multiplexer 7 is thus realized without additional lines via the already provided encoder signals. The command sent by the converter 1 can also be a bit combination that is viewed by the transducer as erroneous. The decoder 15 monitors the data stream and controls the direction of the bidirectional drivers 14b, 24b to the encoder.

What is claimed is:

1. A switching device comprising:
   at least two motors each having a feedback sensor;
   a single servo amplifier converter, wherein the at least two motors are connected to the single servo amplifier by a power line and a feedback line for returning feedback signals for evaluation, respectively;
   wherein the power lines and the feedback lines each have a power switch;
   a logic module connected to the single servo amplifier and configured to evaluate signals received from the single servo amplifier and configured to generate control signals;
   wherein the power switches are actuated by the control signals received from the logic module for selectively switching one of the at least two motors.

2. The switching device according to claim 1, wherein the single servo amplifier has an interface connected by at least one signal line to the logic module.

3. The switching device according to claim 1, wherein the power switches are multiplexers.

4. The switching device according to claim 1, wherein the power switches are switchable simultaneously.

5. The switching device according to claim 1, wherein the feedback lines are combined to a single bidirectional feedback line.

6. The switching device according to claim 5, wherein via the bidirectional feedback line the signals are delivered from the single servo amplifier to the logic module.

7. The switching device according to claim 1, wherein the feedback sensors of the at least two motors cannot measure absolute values and the logic module is adapted to store actual position values of the at least two motors.

8. The switching device according to claim 1, further comprising a changeover module, wherein the logic module is a part of the changeover module.

9. The switching device according to claim 8, wherein the changeover module comprises the power switches for the at least two motors.

10. The switching device according to claim 8, wherein the power switches of the at least two motors are arranged outside of the changeover module.

11. The switching device according to claim 10, wherein the power switches of the at least two motors are controlled by the changeover module.

12. The switching device according to claim 1, wherein the single servo amplifier is provided with an operations software enabling an administration, an actual value acquisition, and a control of several different sequentially operated positioning axes.

13. A servo amplifier for a switching device according to claim 1, comprising an operations software enabling administration, actual value aquisition, and control of several different sequentially operated positioning axes.

14. A switching device comprising:
   at least two motors;
   a single servo amplifier connected to the at least two motors;
   a multiplexer arranged downstream of the single servo amplifier;
   a decoder connected to the multiplexer for controlling the multiplexer;
   encoder lines connecting the single servo amplifier to the decoder for triggering the multiplexer;
   wherein the at least two motors each have a bidirectional driver connected by bidirectional data lines to the multiplexer;
   wherein the bidirectional drivers send signals to the at least two motors to be controlled;
   wherein the bidirectional drivers are directionally switched by signals received from the decoder.

15. The switching device according to claim 14, wherein the decoder is adapted to analyze data signals of the single servo amplifier and further adapted, based on the analysis of the data signals, to generate for certain bit patterns N signals for controlling the multiplexer and the signals for directionally switching the bidirectional drivers connected to the multiplexer.

16. The device according to claim 14, wherein the multiplexer switches N bidirectional data lines connected to the multiplexer.

17. The device according to claim 14, wherein, when using interfaces with a CLOCK signal, the correlated drivers are deactivated for all inactive interfaces by a signal "output enable" OE.

18. The device according to claim 14, wherein the decoder generates additional signals.

19. The device according to claim 18, wherein the additional signals are independent of a control of the multiplexer.

* * * * *